April 15, 1969     N. A. FORBES     3,439,226

FAIL-SAFE DIFFERENTIAL TEMPERATURE CONTROL SYSTEM

Filed May 12, 1966

INVENTOR.
Norman A. Forbes
BY
Eli Weiss
ATTORNEY

United States Patent Office 3,439,226
Patented Apr. 15, 1969

3,439,226
FAIL-SAFE DIFFERENTIAL TEMPERATURE CONTROL SYSTEM
Norman A. Forbes, Louisville, Ky., assignor to American Standard Inc., a corporation of Delaware
Filed May 12, 1966, Ser. No. 549,722
Int. Cl. H02h 5/04
U.S. Cl. 317—41                                                      5 Claims

ABSTRACT OF THE DISCLOSURE

Discloses a fail-safe thermistor sensing circuit for controlling an external circuit in accordance with the changing temperature of a medium into which the thermistor may be immersed. It includes a sensing relay, a rectifier-filter circuit to supply filtered rectified current to the sensing relay winding, another rectifier circuit to supply to the sensing relay winding a pulsing current which is to be additive to the filtered and rectified current, and a thermistor immersed in the medium to be sensed to provide a change in resistance dependent upon the temperature. The current flowing through the sensing relay winding will operate the relay at one temperature of the medium and release the relay at another such temperature of the medium.

---

This invention relates to temperature control systems and more particularly to those in which a thermistor is utilized as a sensing element, or in a sensing circuit, to sense a temperature which is to be controlled, or to sense a temperature with respect to an external system in which a developed temperature provides and serves as a guide or signal to determine a type of control in accordance with a predetermined schedule or pattern.

An object of the invention is to provide a temperature control system that shall be fail-safe, that is, the opening of a circuit or the short-circuiting of a component in a circuit shall not enable or cause the control system to run away and permit the development of an unsafe or dangerous temperature in a system, or circuit, or apparatus, in which the temperature condition is to be controlled within a predetermined range or pattern.

Another object of the invention is to provide a temperature control system, utilizing a thermistor, in which line voltage variations in the energizing supply circuit shall not cause any appreciable shift in the operating point of the control system corresponding to the cut-out temperature at which the supervised circuit or apparatus is to be subjected to a supervisory operation.

A further object of the invention is to provide a temperature control system utilizing a thermistor, which shall be adjustable to vary the operating point corresponding to the drop-out temperature of the control system, and to vary and particularly reduce the effective differential between the drop-out point and the pull-in point as predetermined by the system, in order that such operating differential may be reduced to a minimum value or increased to a desired permissible normal value in order to follow precisely the operating condition achieved and sought to be controlled, or to open up the operating differential to a value that will still permit the control system to maintain an average operating condition in the circuit or apparatus that is to be supervised by the control system.

Still another object of this invention is to provide a temperature control system utilizing a thermistor, with a simple passive circuit, for variably providing for differential adjustment or differential cancelling.

A still further object of the invention is to provide a temperature control system in which a thermistor is utilized, in which the control system is arranged to operate within a relatively small controllable differential, that permits utilization of the thermistor over a selectable range of the thermistor temperature operating characteristic that has maximum linearity.

Another object of the invention is to provide a temperature control system utilizing a thermistor, that shall permit the operation of the thermistor to be utilized under conditions of minimum thermal resistance between the thermistor and ambient temperatures, in order to stabilize the cut-out temperature point at which the thermistor is to operate.

Briefly, the invention contemplates a control system including a sensing relay, having two normally spaced operating points representing pull-in and drop-out values respectively, which is energized from an alternating current supply source through a diode-capacitor filter combination in series with a sensing thermistor. The realy coil is also energized independently of the thermistor by a current pulse from the same supply source through a variably adjustable resistor and a second diode that is polarized in the same direction as the first-mentioned diode, so the pulse current through the relay coil will be additive with the filtered direct current that is controlled by the resistance of the thermistor. Since those two currents are additive to establish the pull-in condition of the relay coil, the two separate current values, that is, the amplitude of the pulses and the amount of current in the thermistor circuit, may be separately and individually predetermined so long as their sum reaches the value required at pull-in energization of the relay coil.

Other objects, the features and advantages of the invention will be apparent from the following detailed description when read with the accompanying drawing, in which FIGURE 1 is a schematic diagram of a basic system illustrating the invention;

Figure 1:
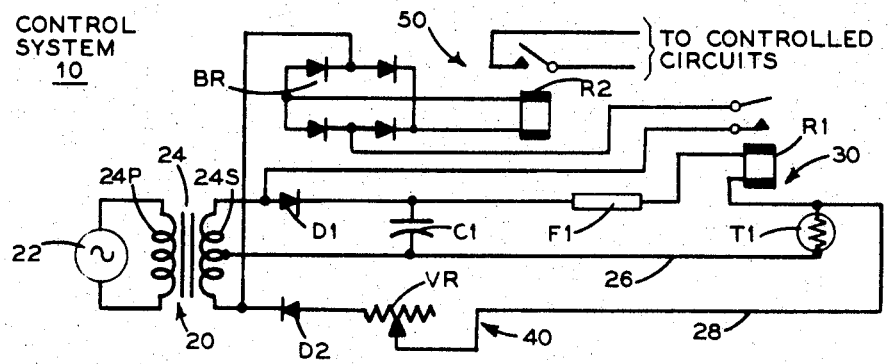

As shown in FIGURE 1, a control system 10 embodying the present invention is shown schematically as including a power supply circuit 20, a thermistor and relay sensing circuit 30, a differential adjustment circuit 40, and a power control circuit 50, which the control system 10 of this invention is intended to supervise and control.

The power supply circuit 20 is shown as an alternating current source 22 of about 110 or 120 volts which energizes the primary winding 24P of a transformer 24. Operating energy is supplied from the secondary winding 24S thereof to the sensing circuit 30, the differential adjustment circuit 40, and the relay control circuit 50 that is to control the external equipment being supervised.

The sensing circuit 30 starts from the top terminal of the secondary winding 24S and includes a diode D1, a protective fuse F1, the relay coil of a sensing relay R1, and a thermistor T1 to the center tap of the transformer secondary 24S through a return conductor 26. In order to supply substantially continuous direct current to the sensing relay R1, a capacitior C1 is connected between the anode terminal of the diode D1 and the return conductor 26.

The differential adjustment circuit 40 includes the diode D1, the fuse F1 and the relay coil of the relay R1, and then continues through conductor 28 through a variable resistor VR and a second diode D2 to the lower terminal of the secondary winding 24S of the transformer 24.

The sensing relay R1 has, normally, two operating points, namely the point at which the relay pulls in and the point at which the relay drops out. These values will vary in any individual relay or in any relay corresponding to its pre-set setting. Thus, the pull-in point represents the point at which the current value is such as to be able to move the relay to the closed position from an open or rest position. Correspondingly, when the current through the operating coil diminishes to a point which is insufficent to hold the relay closed, the relay will drop out. At that point the value of the current in the operating coil constitutes the drop-out value.

The thermistor is a resistive component that has a negative temperature resistance characteristic. In other words, the resistance of the thermistor varies inversely with the temperature, that is, as the temperature in the thermistor increases the resistance of the thermistor decreases, and as the temperature in the thermistor decreases, the resistance increases.

That characteristic of the thermistor, which exhibits a change or variation in resistance in accordance with that inverse change in temperature of the thermistor, is utilized to control the value of the current through the operating coil of the sensing relay. Thus, when the thermistor T1 is cold, and high in resistance, the current through the coil of relay R1 is insufficient to operate the relay to pull-in position. When the thermistor T1 is heated sufficiently to lower its resistance and permit more current to flow through the circuit including the coil of the relay R1, that relay will pull-in and close its contact set to provide an appropriate control signal to the subsequent apparatus in the system.

The differential or spacing between the pull-in value of the coil of relay R1 and the drop-out value of the current to that coil, represents the differential of the control system. Since that differential between the two operating points of the relay represents a corresponding change in the resistance in the thermistor, as a requirement for operation of the relay, a corresponding change in the external system, to effect the thermistor in that way, could be excessive.

An important feature in the present invention is the manner in which such differential in the operation of the relay is modified and compressed to a much smaller desirable value, by essentially taking up some of the slack in the differential spacing, so that only a very small change in current, by means of the thermistor variation, will operate the control system.

The manner in which this feature is achieved may be understood upon referring to FIGURES 2 to 5.

Figure 2:
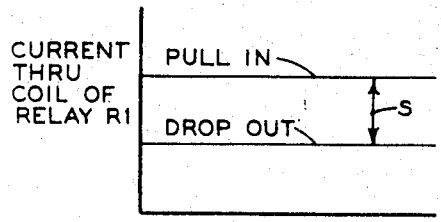
FIGURE 2 is a simple schematic graph illustrating the pull-in and drop-out current values of the thermistor circuit taken alone without modification by the differential adjustment circuit.

As shown in FIGURE 2, the value of current in the coil of relay R1, necessary to cause pull-in operation of the relay is indicated by the value represented by the upper line identified by the legend "pull in." Once the relay has been pulled in by such operating current value, the relay will remain pulled-in or closed, until the current in the coil drops to or below the value indicated by the lower line, indentified by the legend "drop-out."

The differential spacing S between "drop-out" line and the "pull-in" line, in the graph in FIGURE 2, represents the operating differential of the relay R1, in the absence of any other influence on its operation. For the present explanation, this method of operation may be considered conventional. The differential involved in the operation of the relay represents the differential of the system.

Figure 3:
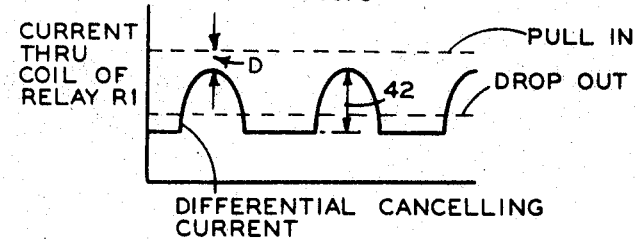
FIGURE 3 is a modified graph similar to FIG. 2, showing a superimposed current waveform representing the current for differential cancelling.

Now, in accordance with the present invention, the graph of FIGURE 3 shows how the relay R1 may be energized through the modifying circuit 40 (FIG. 1) by a pulsing current with an amplitude 42 that carries the peak of the pulse to a short distance D just under the level of the pull-in value of the current through the coil of the relay R1.

It will be seen from reference to FIGURE 3, that the differential cancelling current indicated by the pulses may start from a zero level which is less than the drop-out value of current in the coil of relay R1. The zero base level of the pulse current may be disposed at any current level below drop-out, and for convenience of analysis, the base level of that differential cancelling current may be considered to be the drop-out current level for the coil of the relay R1. Thus, the differential cancelling current alone as indicated by the pulse current of FIGURE 3, would be insufficient to cause operation of the relay R1 to pull-in.

Figure 4:
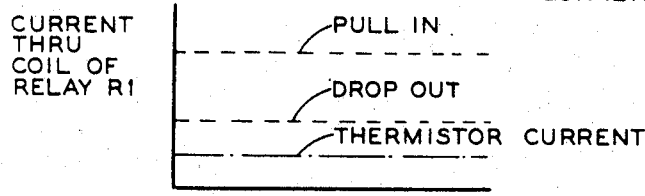
FIGURE 4 is a modified graph similar to FIG. 2 showing a constant current line representing a thermistor current.

FIGURE 4 is a graph similar to that of FIGURE 2, but shows the relative value and locus of the thermistor current alone. As there shown, it is obvious that the thermistor current is less than the drop-out value of the relay and far below the value necessary to cause pull-in operation of the sensing relay R1.

Figure 5:
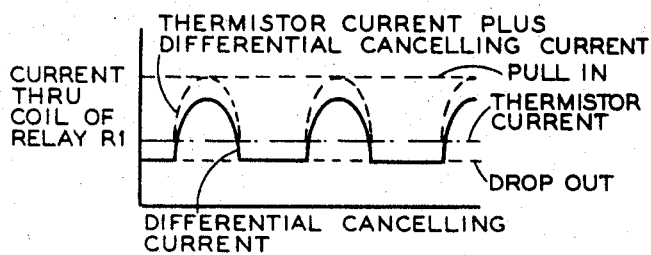
FIGURE 5 is a modified graph of FIG. 2 illustrating how the thermistor current waveform in the operating coil of the sensing relay is combined with and modified by the differential adjustment current.

In FIGURE 5 is shown a graph in which the differential cancelling current and the current through the thermistor are both combined, to illustrate how their sum reaches a value that is in excess of the pull-in value for the relay R1 and thereby establishes an operating current condition in the relay coil to achieve pull-in operation. Since the current in the thermistor circuit is essentially a direct current, which may for the moment be considered of constant value, a pulsing current will be essentially superimposed on that thermistor current and raised to the extent of the pulse amplitudes.

The thermistor current will actually not be constant, as indicated, in view of the filtering effect of the diode D1 and the capacitor C1, but the variation will be small in the slopes of different portions of the current wave.

The illustrations in FIGURE 4 and in FIGURE 5 are, therefore, adequate for a practical illustration of the principle of the invention.

The effect of adjusting the differential control circuit 40 by means of the variable resistor VR is indicated in the following table of actual tests:

TABLE I

| VR (ohms) | Thermistor Resistance at Drop-Out (ohms) | Thermistor Resistance at Pull-In (ohms) | Thermistor Temperature at Drop-Out, °F. | Thermistor Temperature at Pull-In, °F. | Temperature Differential, °F |
|---|---|---|---|---|---|
| (∞___) | 1,520 | 800 | To _____ | To −11.5_____ | 11.5 |
| 20 k_____ | 1,590 | 880 | To + 0.8_____ | To −9.9_____ | 10.7 |
| 8 k_____ | 1,590 | 1,040 | To + 0.8_____ | To −6.8_____ | 7.6 |
| 6 k_____ | 1,580 | 1,160 | To + 0.7_____ | To −4.9_____ | 5.6 |
| 4 k_____ | 1,560 | 1,500 | To + 0.5_____ | To −0.2_____ | 0.7 |

The temperature indicated as $T_o$ represents the temperature at which the resistance of the thermistor was the value 1,520 ohms at a condition where the differential adjustment circuit is open. It will be noted from the third column which shows the thermistor resistor at "pull-in," that the thermistor does not require as much heating and, therefore, is of higher resistance and operates with a lesser differential to achieve pull-in operation of the relay R1 as a result of the adjusting differential control. Reference to the last column shows how such temperature differential in the thermistor is reduced from a conventional differential of 11.5° to less than 1°, with the use of the invention herein, thereby indicating the effectiveness of the differential adjustment by the auxiliary circuit for introducing the pulsing current into the coil of the relay R1.

The invention has been shown in its simplest aspect by merely indicating the control functions. The operation of the relay R1 completes an operating circuit to a DC operated power relay R2 which is of sufficient capacity to carry power currents for operating heavy external equipment that may be desired. In particular, the operation of relay R1 causes its contact set to close and apply alternating current from the secondary 24S of transformer 24 to the input of bridge rectifier BR. The DC output of bridge rectifier BR is connected to the coil of power or slave relay R2.

A functional operating system has been illustrated in simple form merely to illustrate how the functional features of the system are achieved.

What is claimed is:

1. A temperature control system comprising a relay having a current coil and a mechanism operable by said coil from an initial position to a "pull-in" position in response to a predetermined "pull-in" value of current in said coil, and said mechanism being releasable from said "pull-in" position upon reduction of said coil current to a lower "drop-out" value;
   a current source for supplying an energizing current to said relay current coil;
   a thermistor connected in series circuit relation with said relay coil and said source, said thermistor having an operating range of resistance variation between two spaced resistance values corresponding to two spaced internal temperature values, and said thermistor serving by variation of its resistance between said two values to vary the current through said relay current coil to achieve "pull-in" operation or "drop-out" operation of said relay, when said thermistor resistance reaches one or the other of said two values;
   means controllable by said relay for controlling an external circuit;
   and auxiliary circuit means for introducing a calibration-changing current into said relay coil independently of said thermistor, to reduce the normal operating differential of said relay between "pull-in" and "drop-out" points, as against operation of said relay alone.

2. A temperature control system, as in claim 1, in which said auxiliary circuit means are electrically connected to said current source to derive energy therefrom to provide the calibration-changing current for the relay coil.

3. A temperature control system comprising:
   a relay having a current coil and a mechanism operable by said coil from an initial position to a "pull-in" position in response to a predetermined "pull-in" value of current in said coil, and said mechanism being releasable from said "pull-in" position upon reduction of said coil current to a lower "drop-out" value;
   a current source for supplying an energizing current to said relay current coil;
   a thermistor connected in series circuit relation with said relay coil and said source, said thermistor having an operating range of resistance variation between two spaced resistance values corresponding to two spaced internal temperature values, and said thermistor serving by variation of its resistance between said two values to vary the current through said relay current coil to achieve "pull-in" operation or "drop-out" operation of said relay, when said thermistor resistance reaches one or the other of said two values;
   means controllable by said relay for controlling an external circuit;
   said current source including:
      an alternating current supply;
      a current rectifier;
      and a capacitor connected to be energized from said alternating current supply through said rectifier and, in turn, to supply direct current to said relay coil and thermistor in series;
   a differential control circuit containing variable resistance means;
   and means connecting said differential control circuit in series circuit relation with said relay coil.

4. A temperature control system comprising:
   a relay having a current coil and a mechanism operable by said coil from an initial position to a "pull-in" position in response to a predetermined "pull-in" value of current in said coil, and said mechanism being releasable from said "pull-in" position upon reduction of said coil current to a lower "drop-out" value;
   a current source for supplying an energizing current to said relay current coil;
   a thermistor connected in series circuit relation with said relay coil and said source, said thermistor having an operating range of resistance variation between two spaced resistance values corresponding to two spaced internal temperature values, and said thermistor serving by variation of its resistance between said two values to vary the current through said relay current coil to achieve "pull-in" operation or "drop-out" operation of said relay, when said thermistor resistance reaches one or the other of said two values;
   means controllable by said relay for controlling an external circuit;
   means for supplying continuous direct current to said relay coil through a circuit including said thermistor;
   and circuit means independent of said thermistor circuit for supplying periodic current pulses of the same polarity as said direct current to said relay coil, whereby said current pulses will energize said relay coil to almost "pull-in" value and thereby reduce the amount of current necessary through the thermistor circuit to energize said relay coil to "pull-in" value.

5. A temperature control system, as in claim 4, in which said means for supplying continuous direct current through said thermistor circuit include a diode and a capacitor combination:
   and said circuit means for supplying the periodic current pulses to said relay coil include a diode and a variable resistor.

References Cited

UNITED STATES PATENTS

| 1,872,560 | 8/1932 | Breisky | 317—132 X |
| 3,014,159 | 12/1961 | Frank | 317—132 X |
| 3,155,877 | 11/1964 | Jensen | 317—41 X |

FOREIGN PATENTS 873,121  7/1961  Great Britain.

JOHN F. COUCH, *Primary Examiner.*

W. H. BEHA, JR., *Assistant Examiner.*

U.S. Cl. X.R.

317—132